US012777139B2

(12) United States Patent
Knüttel

(10) Patent No.: US 12,777,139 B2
(45) Date of Patent: Oct. 27, 2026

(54) ULTRACOMPACT OPTICAL SYSTEM FOR 3-D IMAGING

(71) Applicant: AKMIRA OPTRONICS GMBH, Potsdam (DE)

(72) Inventor: Alexander Knüttel, Potsdam (DE)

(73) Assignee: AKMIRA OPTRONICS GMBH, Potsdam (DE)

( * ) Notice: Subject to any disclaimer, the term of this patent is extended or adjusted under 35 U.S.C. 154(b) by 0 days.

(21) Appl. No.: 19/127,417

(22) PCT Filed: Nov. 6, 2023

(86) PCT No.: PCT/EP2023/080862
§ 371 (c)(1),
(2) Date: May 6, 2025

(87) PCT Pub. No.: WO2024/099979
PCT Pub. Date: May 16, 2024

(65) Prior Publication Data

US 2026/0181119 A1 Jun. 25, 2026

(30) Foreign Application Priority Data

Nov. 7, 2022 (DE) ..................... 10 2022 129 368.8

(51) Int. Cl.
*H04N 13/236* (2018.01)
*G02B 27/28* (2006.01)
(Continued)

(52) U.S. Cl.
CPC ......... *H04N 13/236* (2018.05); *G02B 27/283* (2013.01); *G02B 27/286* (2013.01); *H04N 13/214* (2018.05); *H04N 13/257* (2018.05)

(58) Field of Classification Search
CPC .. H04N 13/236; H04N 13/257; H04N 13/214; G02B 27/283; G02B 27/286
See application file for complete search history.

(56) References Cited

U.S. PATENT DOCUMENTS

2021/0044748 A1 2/2021 Hu
2021/0405255 A1 12/2021 Kress
(Continued)

FOREIGN PATENT DOCUMENTS

DE 102021114059 10/2022
KR 102292826 8/2021
(Continued)

OTHER PUBLICATIONS

Rosen Joseph et al, "Roadmap on Recent Progress in FINCH Technology", Journal of Imaging, vol. 7, No. 10, Sep. 29, 2021 (Sep. 29, 2021), pp. 1-38.
(Continued)

*Primary Examiner* — Kyle M Lotfi
(74) *Attorney, Agent, or Firm* — JMB Davis Ben-David

(57) ABSTRACT

The invention relates to an optical system (1) for 3D imaging having at least the following components: an input aperture (2) having an optical axis (OA), a first metalens array (3) and a second metalens array (4), a detector (5), wherein the input aperture (2) is configured to collimate object light (10) coming from an object under investigation (S) in a first spectral range and to fix it in a predefined polarization state, wherein the object light (10) propagates to the first metalens array (3) at a first inclination angle (β) in relation to the optical axis (OA) of the input aperture (2), wherein the first metalens array (3) is configured and arranged to focus a first portion (101) of the object light (10) and to leave a second portion (102) of the object light (10) unchanged, wherein the second metalens array (4) is configured and arranged to collimate the focused first portion (101) and to transmit the second portion (102) unchanged, so that the first portion (101) and the second portion (102) enclose a second inclination angle (β') with each other in relation to their respective propagation directions and hit the detector (5) forming
(Continued)

an interference pattern, wherein the second inclination angle (β') corresponds to twice the first inclination angle (β) in terms of magnitude.

23 Claims, 4 Drawing Sheets

(51) Int. Cl.
*H04N 13/214* (2018.01)
*H04N 13/257* (2018.01)

(56) References Cited

U.S. PATENT DOCUMENTS

| | | | | |
|---|---|---|---|---|
| 2022/0107500 | A1 | 4/2022 | Khorasaninejad | |
| 2022/0404619 | A1 * | 12/2022 | Hahn ................ | G02B 27/0172 |

FOREIGN PATENT DOCUMENTS

| | | |
|---|---|---|
| WO | 2017053309 | 3/2017 |
| WO | 2022058498 | 3/2022 |

OTHER PUBLICATIONS

Zhou Hongqiang et al, "All-dielectric bifocal isotropic metalens for a single-shot hologram generation device", Optics Express, vol. 28, No. 15, Jul. 7, 2020 (Jul. 7, 2020), pp. 1-11.
Lee Jonghyun et al, "Digital Incoherent Compressive Holography Using a Geometric Phase Metalens", Sensors,vol. 21, No. 16, Aug. 20, 2021 (Aug. 20, 2021).
Lin Ren Jie et al, "Achromatic metalens array for full-colour light-field imaging", Jan. 21, 2019 (Jan. 21, 2019), vol. 14, No. 3, p. 227-231.

* cited by examiner

ULTRACOMPACT OPTICAL SYSTEM FOR 3-D IMAGING

CROSS-REFERENCE TO RELATED APPLICATIONS

This is the U.S. National Stage of International Patent Application No. PCT/EP2023/080862 filed Nov. 6, 2023, which was published in German under PCT Article 21(2), and which in turn claims the benefit of German Patent Application No. DE 10 2022 129 368.8 filed Nov. 7, 2022.

DESCRIPTION

The invention relates to an optical system for 3D imaging according to claim 1.

Optical 3D imaging systems are known from the prior art, which obtain information about the three-dimensional position, surface structure or composition of an object by evaluating a holographic interference pattern. These holographic systems often work with a scanning light beam, known as the object light, and a reference light beam, known as the reference light, which are brought together in a holographic unit and lead there to an interference pattern on a detector due to the temporal and spatial coherence of the light. Various evaluation measures can be used to draw conclusions about the wave fronts and thus 3D information about the object under investigation being scanned with the object light.

However, these holographic systems have various disadvantages. Such systems often require moving components and a comparatively large installation space, have a comparatively poor spatial resolution or are complex and cost-intensive to manufacture.

Nevertheless, these systems are of great importance, particularly in minimally invasive medicine. 3D imaging applications have now also arrived in the cell phone sector. However, in this context, completely different systems are used that are not based on a holographic principle.

The object of the invention is therefore to provide a 3D imaging system which overcomes the aforementioned disadvantages.

The problem according to the invention is solved by a system according to claim 1.

Advantageous embodiments of the invention are given in the dependent claims and are described below.

Accordingly, an optical system for 3D imaging having at least the following components is provided:

An input aperture having an optical axis,

A first metalens array and a second metalens array,

A detector, wherein the input aperture is configured to collimate object light coming from an object under investigation in a first spectral range, in particular when the input aperture has a lens and the object light originates from a focal plane of the input aperture, and to fix said light into a predefined polarization state which is composed of two polarization states conjugate to one another, wherein the object light propagates to the first metalens array at a first inclination angle, β, with respect to the optical axis of the input aperture, wherein the first metalens array is configured and arranged to focus a first portion of the object light which comprises a first polarization state of the two polarization states conjugate to each other and to leave a second portion of the object light which comprises a second polarization state of the two polarization states conjugate to each other unchanged, in particular leave the collimation unchanged, wherein the second metalens array is configured and arranged behind the first metalens array in the propagation direction of the object light in order to collimate the focused first portion and to transmit the second portion unchanged, in particular to transmit it with unchanged collimation, so that the first portion and the second portion each have the same wavefront curvature after they have propagated through the first and the second metalens array, each have the same wavefront curvature, and in particular are collimated, and enclose a second inclination angle with each other, $\beta'=2*\beta$, in relation to their respective propagation directions and hit the detector forming an interference pattern, wherein the second inclination angle corresponds to twice the first inclination angle in terms of magnitude and three-dimensional position information of an object region of the object under investigation can be created based on the interference pattern.

By using metalenses, the system according to the invention manages to provide a holographic imaging system that solves the aforementioned problems.

Metalenses or, respectively, metalens arrays can be manufactured on a planar structure without the need for complex grinding processes for the manufacture of radii of curvature for conventional lenses. Even more important, however, is the possibility of manufacturing metalenses in such a way that they can perform different optical operations or, respectively, exhibit different properties depending on polarization, wavelength or angle [1].

Polarization is of particular importance in this context, as it can be controlled across wavelengths. Ling Li, et al [2] describes how individual metalenses change their focal length depending on polarization. Depending on the design of the metalens, it can also operate in a broadband spectral range without changing its focusing properties. This is a fundamental difference to diffraction structures, such as optical gratings or holograms, which inherently diffract light depending on the wavelength. The metalens properties are possible, among other things, due to the structures, which are smaller than the optical wavelength and significantly smaller than the typical camera pixel dimension of 2-5 μm. In summary, the prior art describes that metalenses can be designed up to a numerical aperture of NA>0.5 and optical bandwidths>100 nm for various color bands in the red, green and blue (RGB) color range.

In particular, the input aperture can contain optical components such as a lens or a plurality of lenses arranged in a lens arrangement, for example an objective.

Alternatively, the input aperture can also have no lens, but merely comprise a pinhole aperture which—provided the object under investigation is at a sufficiently large distance (e.g. in the range of approx. 100 mm to 500 mm) from the pinhole aperture—images the object light incident from the object under investigation into the system, collimated to a sufficient extent.

Furthermore, the input aperture has an optical element that is configured to impose a predefined polarization state on the object light arriving from the object under investigation. Such an optical element can be a polarizer, for example.

In the context of the present specification, the term "input aperture" refers in particular to a region in front of the first metalens array, which means that the input aperture does not necessarily refer only to an opening of the system, but that the term "input aperture" may extend to all optical components and elements of the system which are arranged in front of the first metalens array in the propagation direction of the object light.

The term "metalens array" refers in particular to the arrangement of a plurality of metalenses, the respective optical axes of which are aligned essentially parallel to each other. In particular, the optical axes of the individual metalenses are aligned parallel to the optical axis of the input aperture.

The dimensions, for example the diameter, of an individual metalens are known in the prior art and can be, in particular, in the range of a few millimeters, e.g. 0.2 mm to 10 mm.

In particular, at least one focal length can be associated with each metalens of a metalens array. This focal length depends, for example, on the polarization state of the incident object light.

Furthermore, the focal length of the metalenses and thus also the focal length associated with the first and/or second metalens array can be wavelength-dependent.

According to one embodiment of the invention, the focal lengths of all metalenses of the first metalens array are the same.

According to a further embodiment of the invention, the focal lengths of all metalenses of the second metalens array are the same.

According to a further embodiment of the invention, the average focal lengths of the first and second metalens arrays are the same.

The term "average focal length" refers in particular to a focal length which is associated with the respective metalens array and which results in particular from an average of all focal lengths of the metalenses arranged in the array, in particular wherein the average focal length corresponds to this average.

According to one embodiment of the invention, the detector comprises a camera having a plurality of photosensitive pixels, wherein these photosensitive pixels are configured to register at least object light from the first spectral range. In this way, an interference pattern can be recorded using the detector.

The recorded interference pattern can then be transmitted in the form of data to an evaluation unit associated with the system or included in the system, which generates three-dimensional information or a three-dimensional representation of at least the object under investigation or a region thereof from the transmitted data.

In the context of the present specification, the term "collimated" and related terms are to be interpreted in particular as meaning that the light has only minimal wave-front curvature at least for one wavelength, in particular for a wavelength or spectral range. With deviating wavelengths, the convergences or divergences of the light beam or, respectively, wave field typically increase depending on the wavelength.

These chromatically induced deviations from the ideal collimation are also covered by the term "collimated" in the context of the present invention. The term "collimated" also includes deviations due to adjustment and system tolerance.

In particular, if the system does not have a lens in the input aperture, the explanations in the previous paragraph apply as understood by the person skilled in the art, namely that the collimation does not have to be perfect, i.e. the light is imaged into the system slightly divergently or convergently.

In particular, it should be noted here that the system is also designed to image and/or process non-collimated object light on the detector in an analog manner, in particular wherein the system makes use of non-collimated light beams in the context of the specification in order to generate depth information, i.e. 3D information about the object under investigation. The description of the invention on the basis of collimated light beams serves in particular only to clearly disclose the position and function of the components of the system in relation to one another, but in particular not to exclude the recording and/or processing of light beams not collimated by the input aperture.

In particular, the term "collimated" and related terms are also understood within the scope of the invention to mean a convergence and/or divergence of the light beam up to a divergence or convergence angle $\xi$ which is in the range $0° < \xi \leq 2*\beta_{max}$, wherein $\beta_{max}$ is the maximum first inclination angle that can be imaged or recorded by the system.

Alternatively or additionally, the term "collimated" and related terms in the context of the specification can also be understood to mean that a light beam diameter (in this context to be understood as a light beam bundle) has a minimum divergence angle at its narrowest point. This image for the definition of a collimated light beam is applied in the area of the wave-optical description of a laser beam and can be applied to the system in an analogous manner. This definition is particularly applicable to input apertures that have at least one lens.

According to the invention, the first inclination angle can be measured with respect to a propagation direction and the optical axis of the input aperture.

In relation to a wave representation of the object light, this means that the planar wave fronts of the collimated object light after the input aperture have an angle of $90°+\beta$ with respect to the optical axis of the input aperture.

The predefined polarization state of the object light after the input aperture comprises two polarization states that are conjugate to each other. These two polarization states can in particular be two linearly polarized polarization states, in particular a p-polarized and an s-polarized state.

Alternatively, the two polarization states can also represent a right-hand and a left-hand circularly polarized state.

It should be noted that the predefined polarization state is in particular a superposition of these two conjugate polarization states.

If the object light with the predefined polarization state now hits the first metalens array, this first metalens array will, due to its optical properties, focus the object light having the first polarization state of the two polarization states that are conjugate to each other, in particular onto the focal plane associated with the first metalens array. In contrast, the first metalens array, also due to its optical properties, allows the object light having the second polarization state of the two polarization states that are conjugate to each other to be transmitted essentially unchanged. In other words, the first metalens array does not lead to any increased convergence or divergence with object light that has the second polarization state, but behaves essentially like an optically transparent medium without diffraction properties, i.e. like a neutral optical medium, for example like a homogeneous glass pane.

As a result, the object light hitting the first metalens array is split into a first portion consisting of object light of the first polarization state and a second portion consisting of object light of the second polarization state.

Ideally, the ratio of this splitting is approx. 1:1, i.e. the object light is split into two equally intense portions.

The two portions of the object light then hit the second metalens array, which is equipped with optical properties that are identical or at least analogous to the first metalens array.

In particular, the second metalens array is arranged in such a way that it recollimates the first portion and allows the already collimated second portion to be transmitted essentially unchanged. Here too, the second metalens array behaves essentially as a transparent neutral optical medium with regard to the second portion, as already explained for the first metalens array.

In particular, the system is designed, for example by means of corresponding optical components, such that an angle at which the first portion hits the first metalens array is inverted compared to the first inclination angle when it propagates through the second metalens array. In this way, the first portion and the second portion enclose the second inclination angle with each other. The second inclination angle can either be measured with respect to the propagation direction of the first and second portions, or alternatively but equivalently as the angle between the wavefronts of the first and second portions.

Due to the design according to the invention, the second inclination angle is twice as large as the first inclination angle. This is particularly the case if the focal lengths associated with the first and second metalens arrays are the same.

The first and second portions are superimposed behind the second metalens array so that an interference pattern is formed on the detector. Based on the interference pattern and an analysis of the same, three-dimensional information of an object region of the object under investigation can be created.

The object region comprises one or more illumination regions with object light, wherein the illumination region on the object under investigation is essentially circular with a diameter in the range of 1 mm to 50 mm.

The term “focus” or related terms refer in particular to setting the wavefront curvature, which causes the assigned light beam or, respectively, the light wave bundle to be convergent, i.e. to be imaged to a smallest beam diameter (focal point) at a position in space.

Complete three-dimensional information about the object under investigation can be generated, for example, by optical scanning, in particular by a relative displacement of the system in relation to the object under investigation. In addition or alternatively, a plurality of object regions of the object under investigation can be imaged, recorded and analyzed simultaneously by the system.

It is noted that object light reflected from the object under investigation at a distance from the input aperture causes the object light not to be collimated by the input aperture but to have a different wavefront curvature, so that diverging or converging the object light is generated.

This situation is often the case in the case of an input aperture that comprises only a pinhole aperture instead of a lens, since a pinhole aperture has no assigned focal length. However, if the object light falls on the pinhole aperture from a sufficiently large distance, the pinhole aperture causes a sufficiently high degree of collimation or, respectively, a sufficiently low degree of divergence of the object light, so that it is regarded as collimated in the context of the invention.

However, even in the case that the object light is not collimated within the scope of the definition of the present specification, this light is imaged and recorded by the system in accordance with the physical principles and can be included in a corresponding evaluation in order to obtain 3D information about an object region (e.g. a surface of the object under investigation) of the object under investigation.

The second portion of the object light will in any case (collimated or non-collimated) propagate unchanged through the first and second metalens arrays according to the principles described above. The first portion focused by the first metalens array behaves in the same way, wherein the first portion does not fall on a focal plane associated with the first metalens array, but in front of or behind it, and wherein the second metalens array, in accordance with the wavefront curvature, generates a first portion with a correspondingly changed wavefront curvature.

These originally non-collimated first and second portions also lead to an interference pattern on the detector and can be evaluated accordingly in order to obtain three-dimensional information about the object region.

According to a further embodiment of the invention, it is provided that the first and the second portion of the object light are each perpendicularly linearly polarized with respect to each other, in particular s- and p-polarized, in particular wherein the predefined polarization state is a linearly polarized polarization state consisting of a superposition of the first and the second portion.

Linearly polarized light can be generated comparatively easily. Furthermore, a polarization state can be determined comparatively easily with regard to its polarization if the polarization is linear along one direction. In contrast, it can be more difficult to distinguish a circularly polarized state from an elliptically polarized state. A plurality of optical elements are configured to split or, respectively, differently manipulate conjugate linearly polarized light, so that a linear polarization of the first and second portions can be advantageous.

According to a further embodiment of the invention, the system comprises a polarization-dependent beam splitter, in particular a polarization-dependent beam splitter cube, between the first and second metalens arrays, wherein the system also has the following components:

- A first mirror, in particular wherein the first mirror is planar,
- A reflector array comprising a plurality of reflective retroreflectors,
- A first λ/4 element arranged between the polarization-dependent beam splitter and the first mirror,
- A second λ/4 element arranged between the polarization-dependent beam splitter and the reflector array, wherein the polarization-dependent beam splitter is arranged in relation to object light incident from the first metalens array in such a way that the first portion is reflected by the beam splitter and the second portion is transmitted through the beam splitter, wherein the reflector array is arranged to reflect the first portion back in the direction of the beam splitter and to the second metalens array, wherein the first mirror is arranged to reflect the second portion back in the direction of the beam splitter and to the second metalens array, in particular wherein the back-reflected first and the back-reflected second portion propagate through the polarization-dependent beam splitter in the direction of the second metalens array due to the polarization states reversed by the respective λ/4 elements, in particular wherein the first and the second portion each propagate twice through either the first or the second λ/4 element so that the first and the second portion have reversed polarization states after the second passage through the respective λ/4 element.

In other words, the polarization-dependent beam splitter is arranged in relation to object light incident from the first metalens array such that the first portion is reflected by the beam splitter and the second portion is transmitted by the beam splitter, wherein the reflector array is arranged on a side of the beam splitter to which the first portion coming from the first metalens array and reflected by the beam splitter propagates, wherein the first portion hitting the reflector array is reflected back in the direction of the beam splitter and to the second metalens array, wherein the first mirror is arranged on a side of the beam splitter which is opposite the first metalens array, i.e. on the side to which the second portion coming from the first metalens array and transmitted by the beam splitter propagates, wherein the first mirror reflects the second portion hitting the first mirror back in the direction of the beam splitter and to the second metalens array, in particular wherein the back-reflected first and the back-reflected second portion propagate through the polarization-dependent beam splitter in the direction of the second metalens array due to the reversed polarization states.

The polarization-dependent beam splitter is configured in particular to reflect one of the two portions of the object light and transmit the other.

A λ/4 tile, for example, can be used as the λ/4 element. In other words, an optical retardation element that has different refractive indices for different polarization directions. This allows the polarization state of the object light to be changed.

According to the invention, it is provided that when the first and/or second portion passes through twice, each portion assumes its conjugate polarized state. For example, passing through the λ/4 element twice converts an s-polarized state into a p-polarized state and vice versa.

As a result, the back-reflected portions at the polarization-dependent beam splitter both propagate in the direction of the second metalens array.

With this configuration, it should be noted that the second metalens array must be designed with regard to the focusing properties depending on the polarization of the object light in such a way that it collimates the focused first portion. In other words, if no further optical element, which converts the polarization states of the first and second portions back to their original polarization states imposed after the input aperture, is arranged in front of the second metalens array, the focusing property of the second metalens array should be directed, compared to the first metalens array, to the conjugate polarization state in each case.

According to a further embodiment, the number of retroreflectors comprised in the reflector array is identical to the number of metalenses in each case of the first and second metalens arrays.

According to a further embodiment of the invention, it is provided that a first λ/2 element is arranged between the polarization-dependent beam splitter and the second metalens array and is configured to reverse the polarization states of the first and second portions, in particular so that the polarization states of the first and second portions again correspond to the polarization states of the first and second portions after the input aperture.

The first λ/2 element is arranged in particular in such a way that it is only passed through in the propagation direction of the first and second portions after the first and second portions have propagated twice through the beam splitter or, respectively, a beam splitter surface of the beam splitter.

This embodiment makes it possible to use a second metalens array identical to the first metalens array, which does not have to have inverse properties with respect to the polarization states as described in the previous paragraph, but which has the identical properties with respect to the polarization states as the first metalens array.

The First λ/2 element is, in particular, a λ/2 tile.

This allows cost-effective and simplified production of the system.

According to a further embodiment of the invention, it is provided that the system comprises an actuator arrangement which is configured to set a position of the first mirror and/or the reflector array so that a phase can be set between the wavefronts associated with the first and second portions.

This design makes it possible to set a relative phase position between the first and second portions, so that in particular a uniform light portion on the detector can be avoided. In particular, the actuator arrangement is configured to set the position of the first mirror and/or the reflector array in such a way that phase shifts of more than 2π are possible. This has advantages in particular for the color resolution of the system.

The actuator arrangement should be configured to shift the position of the first mirror and/or the reflector array in fractions of wavelengths of the first spectral range, in particular along the optical axis. It can be advantageous in particular for adjustment purposes if the actuator arrangement is configured to tilt the first mirror and/or the reflector array with respect to the optical axis of the input aperture.

Furthermore, it can be advantageous that the actuator arrangement is configured to adjust a position of the reflector array perpendicular to the optical axis of the input aperture.

The actuator arrangement is used in particular to lengthen or, respectively, shorten an optical path length of the first and/or second portion of the object light.

The actuator arrangement can be controlled via an external control unit that is associated with the system.

According to an embodiment invention, the actuator arrangement comprises at least one piezo element. In particular, the actuator arrangement comprises at least one ring piezo arrangement.

Although a piezo element is strictly speaking a moving part, the comparatively monolithic design of a piezo element means that there is no particular risk of wear due to exposed precision mechanics, so that the system can be considered to be largely free of moving components despite the piezo element.

The use of piezo elements contributes in particular to the increased robustness of the system. Piezo actuators can also be controlled and set particularly accurately and precisely.

According to an alternative embodiment in which no beam splitter is required, it is provided that the system comprises a transparent solid element, a first surface of which faces in the direction of the first metalens array and a second surface of which, opposite the first surface, faces in the direction of the second metalens array, in particular wherein a volume comprised by the transparent solid element is free of selectively reflecting and selectively diffracting surfaces, in particular wherein the transparent element is cuboidal or plate-shaped.

This embodiment can be advantageous if a particularly compact design is desired along an installation direction, for example along the optical axis of the input aperture.

The solid transparent element can be a simple glass plate or a simple polymer plate that is transparent in the first spectral range.

According to one embodiment of the invention, the solid transparent element is made of a material selected from the group consisting of glass, polymer or crystal.

Whereas in an embodiment with a beam splitter the metalens arrays enclose an angle of 90° to each other, in this embodiment the metalens arrays are positioned exactly opposite each other and enclose the solid transparent between them.

According to a further embodiment of the invention, it is provided that the system comprises at least one liquid crystal which is configured to adapt a phase between the wavefronts of the object light associated with the first and the second portion, in particular wherein the at least one liquid crystal is configured to change the phase between the wavefronts of the first and the second portion via a control module.

For example, the liquid crystal can be arranged along the optical axis of the input aperture between the first and second metalens arrays in addition to the solid transparent element. Alternatively, the solid transparent element can comprise the liquid crystal or, respectively, consist of the liquid crystal. In the latter embodiment, the liquid crystal should have birefringent properties.

If it is an embodiment with a beam splitter, the liquid crystal can be arranged on one of the sides that have the first mirror or the reflector array.

In a further embodiment, if the beam splitter is a beam splitter cube, one of the triangular prisms constituting the beam splitter can comprise the liquid crystal or, respectively, consist of the liquid crystal.

Alternatively, both triangular prisms constituting the beam splitter can also comprise a liquid crystal. In this way, a phase can be set individually for both the first and the second portion of the object light in relation to the other portion. In addition, the use of two liquid crystals enables a longer optical path overall, so that larger phase shifts between the first and second portions are possible.

The use of a liquid crystal to set the relative phases of the first and second portions enables the production of a system that is completely free of moving components and therefore has an extremely high degree of robustness.

According to one embodiment of the invention, which has already been described in a preceding paragraph, it is provided that the transparent solid element comprises the at least one liquid crystal or consists of the at least one liquid crystal.

According to one embodiment of the invention, which has already been described in a preceding paragraph and comprises a polarization-dependent beam splitter cube according to at least one of the previous embodiments, it is provided that the polarization-dependent beam splitter comprises a first and a second prism forming a beam splitter cube of the beam splitter, wherein the first and/or the second prism comprises the at least one liquid crystal, in particular wherein both the first and the second prism have a liquid crystal.

According to one embodiment of the invention, a focal plane of the first metalens array and a focal plane of the second metalens array lie on top of each other.

According to one embodiment of the invention, it is provided that an analyzer is arranged behind the second metalens array and in front of the detector in the propagation direction, which analyzer is configured to change the polarization states of the first and second portions so that interference of the first portion with the second portion is achieved on the detector.

This embodiment enables a higher interference contrast on the detector.

According to one embodiment of the invention, it is provided that the input aperture comprises a polarizer, which is configured to bring the object light from the first spectral range into the predefined polarization state.

According to one embodiment of the invention, it is provided that the input aperture comprises at least one lens, which is configured to collimate the object light.

According to an alternative embodiment of the invention, it is provided that the input aperture comprises a pinhole aperture as an imaging element, and in particular wherein the input aperture is free of lenses or refracting optical elements that collimate the object light originating from the object under investigation.

According to one embodiment of the invention, it is provided that the system is configured to deflect the propagation direction of the object light from the first spectral range hitting the system in a wavelength-dependent manner, so that the object light and the first and second portions enclose a wavelength-dependent angle with the optical axis in addition to the first inclination angle.

This can be achieved, for example, by a corresponding metalens design of the first metalens array.

This embodiment enables an improved color resolution of the system, since object light in the first spectral range is imaged to different regions of the detector depending on the wavelength.

According to one embodiment of the invention, it is provided that the object light in the first spectral range consists of two or more disjoint wavelength ranges and/or wherein the system is configured to filter the object light into two or more disjoint wavelength ranges forming the first spectral range, wherein there are gaps between the wavelength ranges, in particular wherein these gaps are each at least 50 nm wide, so that an interference pattern is generated on the detector for each wavelength range, from which three-dimensional position information and a color composition with respect to the wavelength ranges of an object region of the object under investigation can be created.

In particular, the first spectral range is split into the three primary colors red, green and blue, which can be translated into the following wavelength ranges, for example:

The wavelength range of the first spectral range for the blue color channel extends in particular from 420 nm to 480 nm, the wavelength range of the first spectral range for the green color channel extends in particular from 520 nm to 565 nm, and the wavelength range of the first spectral range for the red color channel extends in particular from 630 nm to 680 nm.

According to one embodiment of the invention, it is provided that the object light comprises at least one further spectral range which is different from and disjoint from the first spectral range, wherein the first and second metalens arrays and the polarization-dependent beam splitter are transparent and optically inactive, i.e. neutral, for light from the at least one further spectral range, wherein the polarization-dependent beam splitter further comprises a VPH (volume phase hologram) which is configured to diffract the light from the at least one further spectral range in a polarization- and angle-dependent manner and to be transparent and optically inactive, i.e. neutral, for the light from the first spectral range.

The first and the at least one further spectral range can occupy alternating wavelength ranges along the spectrum. In particular with regard to the previous embodiment, the further spectral range can be arranged, for example, between the green and the red color channel, and in particular be limited in a spectral range between 570 nm and 620 nm. Alternatively and/or additionally, the at least one further spectral range can extend from the near infrared range, i.e. in particular from 700 nm or 800 nm upwards into the infrared range of more than 1300 nm. Since the VPH is arranged in a Littrow arrangement in particular and is designed for wavelengths from the further spectral range, incident object light from the further spectral range (also referred to as the second spectral range in the context of the specification), which propagates along the optical axis of the input aperture and hits the VPH, is diffracted at an angle of 90° in the direction of the detector. In particular, the incident object light from the second spectral range is s-polarized when it hits the VPH.

In this embodiment, in particular reference light, which is coupled into the beam splitter via a reference arm, is caused to interfere with the object light, which is coupled in via the so-called object arm, on the detector.

According to one embodiment of the invention, it is therefore provided that the system is configured to direct reference light from the second spectral range, in particular via a reference arm, to the VPH via a side of the beam splitter opposite the input aperture, wherein the first mirror is transparent in particular for reference light, i.e. in particular for light from the second spectral range.

According to this embodiment, reference light, which in particular is also s-polarized when it hits the VPH, can be collimated from the second spectral range on the side of the beam splitter opposite the input aperture and also sent to the VPH in Littrow configuration (the first mirror must be transparent for the second spectral range for this). There, the reference light is also diffracted at 90° in the opposite direction from the detector. There it is reflected by a mirror or a prism arrangement, wherein the mirror and/or the prism arrangement enclose an angle of more or less than 45°, for example 45±0.2°, with the VPH. As a result, the back-reflected reference light is at least partially transmitted at the VPH and interferes with the object light in the second spectral range. This interference pattern can be advantageously used to generate an increased spatial resolution along the optical axis of the input aperture. In particular, the further spectral range consists of a plurality of disjoint spectral lines that have a very small line width, for example on the order of sub-nanometers, and extend over a range of, for example, 10 nm to 50 nm. Since the VPH diffracts each of these spectral lines slightly differently, this type of "optical combs" can be used to generate the increased spatial resolution along the optical axis from the resulting interference patterns on the detector.

Similar holographic systems are known, but instead of a VPH they have, for example, conventional transmission diffraction gratings, which, however, have disadvantageous properties with regard to the desired properties.

It is noted that, for the functionality of this embodiment, the first mirror is advantageously at least partially transparent with respect to the light in the second spectral range.

Furthermore, it can be advantageous if the second λ/4 element is in particular optically neutral, i.e. Exerts no significant effect on the light.

Alternatively, a third λ/4 element can be provided which, for example, is arranged in front of the first mirror as seen from the incident reference light, i.e. in particular is not accessible for object light in the first spectral range, wherein the third λ/4 element is configured to rotate the polarization of the reference light by 90° together with the second λ/4 element, in particular so that the reference light advantageously hits the VPH in an s-polarized state.

This is described in the following embodiment of the invention, according to which the system comprises a third λ/4 element, which is arranged on a side of the first mirror facing away from the beam splitter, and which is configured to bring the reference light into a predefined polarization state in cooperation with the second λ/4 element, so that the reference light is linearly s-polarized when it comes from the first mirror and hits the VPH.

Furthermore, it is advantageous if the polarization-dependent beam splitter also does not exert any optical effect on light in the second spectral range, i.e. is also optically neutral. Furthermore, the first and second metalens arrays are advantageously optically neutral for light from the second spectral range.

The reference light in the second spectral range can be provided by a reference light source, for example a laser, which can also serve as an object light source.

Furthermore, the system may have a collimating lens for the reference light so that the reference light can be collimated and propagate in the direction of the VPH. A polarizer may also be provided to ensure that the reference light hits the VPH in the s-polarized state.

According to a development of the previous embodiment, it is provided that the system has a wavelength-selective prism arrangement between the reflector array and the beam splitter, which prism arrangement is configured to reflect light, in particular the reference light of the at least one further spectral range diffracted by the VPH in the direction of the reflector array, at a prism angle in the direction of the detector, and wherein the prism arrangement is transparent and optically inactive for light from the first spectral range.

As already mentioned, the prism angle is set so that a reflective surface of the prism arrangement forms an angle not equal to 45° with the VPH, wherein, in particular, an angle greater than 45.2° in magnitude is enclosed.

This "tilted position" means that the reference light beam reflected back from the prism arrangement is transmitted through the VPH to a sufficiently high degree so that sufficient reference light is available for interference on the detector with the object light in the second spectral range. By expanding the system in this way, the resolution along the optical axis can be improved down to the sub-millimeter range or even into the sub-micrometer range.

Further features and advantages of the invention are explained below with reference to the figure description of exemplary embodiments. In the figures.

Figure 1:
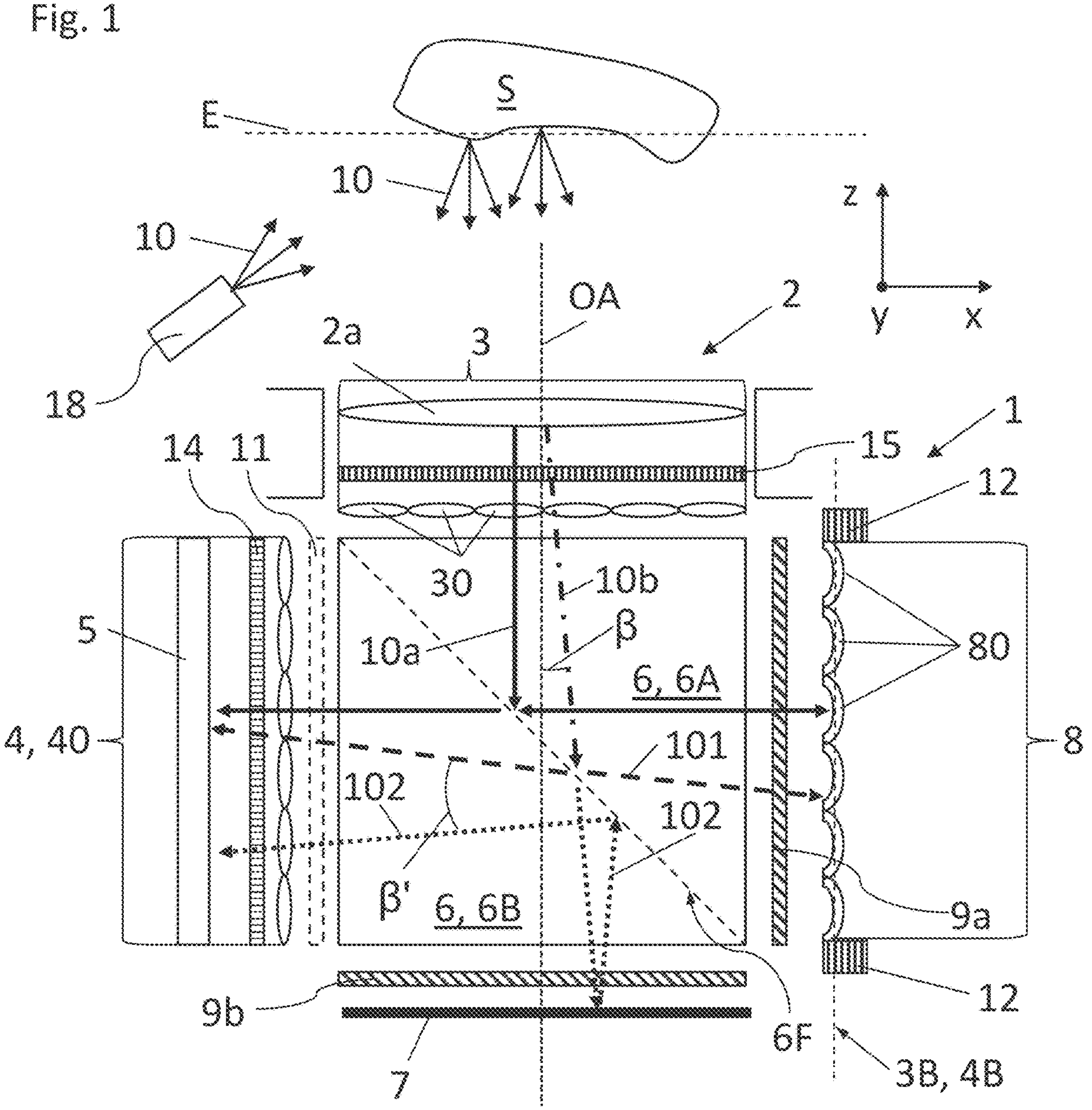
FIG. 1 shows a schematic view of a first embodiment of the invention.

FIG. 1 schematically shows a system 1 according to an exemplary embodiment of the invention. The system 1 is configured to be used in holographic imaging applications. In particular, the system 1 is suitable for three-dimensional color imaging.

A particular advantage of the system shown in FIG. 1 is its extremely compact design, which is achieved in particular by the fact that no moving components or fault-prone precision mechanical components are required.

The system 1 shown in FIG. 1 is also referred to as a compact 3D color module in the context of the invention. The system 1 is configured to capture a surface or a region below the surface of an object under investigation S—alternatively also referred to as an object in the present specification—in three dimensions and, if necessary, to display it.

To do so, the object S is illuminated, for example, in a point-shaped region with an external light source 18, which can be comprised in the system 1 or can also be arranged separately. The light 10 with which the object under investigation S is illuminated is also referred to as object light 10 in the context of holography. Natural ambient light can also serve as the light source 18—even if it does not necessarily illuminate the object S in a point-shaped region.

The object S—in response to the illumination reflects the object light 10 via various processes such as scattering, reflection or luminescence. The object light 10 originating from object S is collected via the input aperture 2 of system 1.

In the following and also in parts of the description, the case is considered in which the object light S originating from the object under investigation S originates from or near a plane E of the object under investigation S, which plane lies in a focal plane E of the input aperture 2. In cases in which the object light 10 originates from a plane near the focal plane E of the input aperture 2, the system 1 behaves according to the differently curved wave fronts of the object light 10 at the input aperture 2, which is known to the person skilled in the art.

The input aperture 2 is configured to collimate the object light 10 originating from the object under investigation S, in particular the object light 10 originating from the focal plane E of the input aperture 2. It should be noted that the input aperture 2 can have a collimating optical unit 2*a*, e.g. in the form of one or more lenses 2*a*. In the case shown in FIG. 1, the input aperture 2 comprises a collimating lens 2*a*. However, it is also possible that the collimating optical unit 2*a* only comprises a pinhole aperture (not shown). With a correspondingly small pinhole aperture and/or sufficiently high object distance, the incident object light 10 is also collimated or at least has a sufficiently high degree of collimation.

Irrespective of the design of the input aperture 2, collimated light refers in particular to light with essentially flat wavefronts.

In addition, the input aperture 2 has an optical axis OA. The optical axis OA in FIG. 1 extends centrally and perpendicular to the input aperture 2 or, respectively, to the collimating lens 2*a*. The collimating lens 2*a* is at least configured to collimate object light 10 from a first spectral range. In addition, the collimating lens 2*a* can also be configured to collimate object light 10 from a second spectral range. In this case, the collimating lens 2*a* can comprise an achromatic lens, an apochromatic lens or a superapochromatic lens, for example.

The figures use the representation of light in the form of ray optics. This means that the wave fronts and the curvatures of the wave fronts in the light beams depicted in the figures are regularly not shown. However, the person skilled in the art knows how light wavefronts are influenced by the various optical components of the system 1 and how a propagation direction or, respectively, the properties of the light are influenced as a result.

FIG. 1 shows two different light beams 10*a*, 10*b* of the object light 10. The first situation relates to a first object light beam 10*a*, which originates from a region of the object under investigation S that lies on the optical axis OA of the input aperture 2. The second situation relates to a second object light beam 10*b*, which originates from a region of the object under investigation that is laterally offset from the optical axis of the input aperture 2. The term "laterally offset" can, for example, be described using a Cartesian coordinate system (x, y, z as indicated in FIG. 1) that is associated with the input aperture 2. The z-axis extends along the optical axis OA of the input aperture 2 and the x- and y-axes extend perpendicular to it, i.e. laterally to the optical axis OA. The terms "first" and "second" are only used to differentiate, not to indicate a sequence.

The first object light beam 10*a* is collimated by the collimating lens 2*a* and then propagates parallel to the optical axis OA of the collimating lens 2*a*, i.e. it encloses an angle of 0° with the optical axis OA of the input aperture 2. The angle enclosed by the collimated object light 10, 10*a*, 10*b* with the optical axis OA is also referred to as the first inclination angle β in the context of this specification.

The first inclination angle β is defined in particular by the angle enclosed between the optical axis OA of the input aperture 2 and the propagation direction of the collimated object light beam 10, 10*a*, 10*b*.

The second object light beam 10*b* is also collimated by the collimating lens 2*a* and then propagates further, however, with a first inclination angle to the optical axis OA of the collimating lens 2*a* that is not equal to 0°. According to the laws of ray optics (in interaction with the input aperture 2), the first inclination angle β contains information about the lateral position on the object under investigation from which the relevant object light beam 10*b* originates.

A polarizer 15 is arranged behind the collimating lens 2*a* and is configured and optionally can be set to bring the object light 10 into a predefined polarization state.

In particular, the polarizer 15 is configured in such a way that it brings the object light 10 into the predefined polarization state—at least for object light 10 from the first spectral range.

It should be noted that the polarizer 15 can also be arranged in front of the collimating lens 2*a*. And the incident object light 10 is first collimated by the collimating lens 2*a* downstream of the polarizer 15. It is also conceivable that the collimating lens 2*a* or, respectively, the input aperture 2 itself has a corresponding polarizing property.

The terms "behind" and "in front" are to be understood in particular as referring to an arrangement with respect to the propagation direction of the object light 10 and less to its geometric sequence or arrangement, which can deviate from the "purely optical" beam path due to convolutions by beam splitters or mirrors.

In the present case, the polarizer 15 is arranged and set (e.g. at a rotation angle of 45°) in such a way that the object light 10 has s- and p-polarized light in approximately equal proportions, irrespective of a direction of incidence or the first inclination angle β. This means that the predefined polarization state in this example is composed of a first polarization state, which comprises s-polarized object light, and a second polarization state, which comprises p-polarized object light. It is assumed that the person skilled in the art is familiar with the terms s- and p-polarized light as linear polarization directions conjugate to each other. The assignment of the s-polarized object light to the first polarization state of the p-polarized object light to the second polarization state can also be done the other way round and is only for illustrative purposes.

In general, the polarizer 15 can be configured to convert the incident object light 10 into object light 10 which has two polarization states conjugate to each other. These could, for example, also be left-hand and right-hand circularly polarized object light 10.

In the following, the case of s- and p-polarized polarization states will be discussed without restriction of generality. This is generally valid insofar as the object light originating from the object under investigation can also be unpolarized, wherein this object light is "seen" by the first metalens array in any case—even without polarizer 15—as the first and second portions, since unpolarized light also comprises s- and p-polarized components.

The object light 10 with the predefined polarization state just described now hits a first metalens array 3 according to the invention. The first metalens array 3 comprises a plurality of metalenses 30 arranged in an array. According to the invention, the first metalens array 3 is now arranged and configured such that it focuses a first portion 101 of the object light, which has the first polarization state, i.e. at least increases the wavefront curvature, so that the object light is convergent, whereas a second portion 102 of the object light, which has the second polarization state, propagates essentially unchanged through the first metalens array. This means that if the object light has been collimated by the input aperture 2, the second portion 102 remains collimated after it has propagated through the first metalens array 3.

The term "unchanged" in the context of the metalens array 3, 4 refers in particular to the fact that the wavefronts of the second portion 102 or, respectively, of the second polarization state can ideally pass through the metalens array 3, 4 completely unchanged, so that the wavefronts of the second portion 102 or, respectively, of the second polarization state are unchanged in front of and behind the metalens array. The person skilled in the art is aware that slight changes in the wavefronts can still occur due to imperfections in the metalens array 3, 4. This is intended to be reflected in the expression "essentially." The term used synonymously in the context of this specification is "optically neutral."

In particular, the focused first portion 101 is focused in such a way that it is focused on a focal plane 3B associated with the first metalens array 3.

A polarization-dependent beam splitter 6 is arranged behind the first metalens array 3, in particular in front of the focal plane 3B of the first metalens array 3. In the example in FIG. 1, the polarization-dependent beam splitter 6 is a polarization-dependent beam splitter cube. The beam splitter cube 6 comprises two triangular prisms, e.g. a first and a second triangular prism 6A, 6B, which are connected at their base surface and define a beam splitter surface 6F along the base surfaces. The beam splitter surface 6F extends at a 45° angle to the optical axis OA of the input aperture 2 or, respectively, of the first metalens array 3.

The first object light beam 10*a*, comprising a first and second portion, and the second object light beam 10*b*, also comprising a first and second portion 101, 102, now hit the first triangular prism 6A of the beam splitter 6 and propagate through it to the beam splitter surface 6F.

Object light 101 of the first polarization state of the first and second object light beams 10*a*, 10*b* is reflected at the beam splitter surface 6F, whereas object light 102 of the second polarization state is transmitted.

In the following, first the object light beams of the first portion 101 are considered, which were focused by the first metalens array 3, i.e. have the first polarization state behind the first metalens array 3, and are thus reflected at the beam splitter surface 6F. This light propagates further in the first triangular prism 6A and then hits a first λ/4 plate 9*a*, which is arranged, for example, on a surface of the beam splitter cube 6. The first λ/4 plate 9*a* causes a change in the polarization state of the first portion 101; in this example, the polarization state is changed from linearly polarized to circularly polarized.

Behind the first λ/4 plate 9*a*, a reflector array 8 is arranged perpendicular to the (correspondingly convoluted) optical axis OA of the input aperture 2. The reflector array 8 comprises a plurality of retroreflectors 80 arranged in an array, which are configured to reflect the light in the direction from which it came, largely independently of a direction of incidence of the incoming light 101. Furthermore, the reflector array 8 is arranged along or parallel offset in the vicinity of the focal plane 3B of the first metalens array 3.

The reflector array 8 comprises the same number of retroreflectors 80 as the first metalens array 3 comprises metalenses 30, and also the same number of retroreflectors 80 as the second metalens array 4 comprises metalenses 40.

The first portion 101 reflected back by the reflector array 8 now propagates again through the first λ/4 plate 9*a*, which in turn changes the polarization state of the first portion 101 in such a way that the polarization state of the first portion 101 now corresponds to the second polarization state of the object light behind the input aperture 2—in this example, the polarization state of the first portion thus changes from s-polarized light to p-polarized light after the first portion 101 has propagated a total of two times through the first λ/4 plate 9*a*.

The first portion 101 then propagates again through the first triangular prism 6A and hits the beam splitter surface 6F, where the first portion 101 is now transmitted due to the changed polarization. The first portion 101 then propagates further through the second triangular prism 6B and then hits a second metalens array 4, which is arranged opposite the reflector array 8 on the beam splitter 6.

Let us now turn to the second portion 102 of the object light. The second portion 102 of the object light, i.e. the portion that has the second polarization state, propagates behind the beam splitter surface 6F through the second triangular prism 6B of the beam splitter 6 and then through a second λ/4 plate 9*b*, which is arranged, for example, on a side of the beam splitter cube 6 opposite the first metalens array 3.

The second λ/4 plate 9*b* causes a change in the polarization state of the second portion 102; in this example, the polarization state is changed from linearly polarized to circularly polarized. Behind the second λ/4 plate 9*b*, a planar mirror 7 is arranged perpendicular to the optical axis OA of the input aperture 2, which reflects back the second portion 102. The back-reflected second portion 102 now propagates again through the second λ/4 plate 9*b*, which in turn changes the polarization state of the second portion 102 in such a way that the polarization state of the second portion 102 now corresponds to the first polarization state of the object light behind the input aperture 2—in this example, the polarization state of the second portion 102 thus changes from p-polarized light to s-polarized light after the second portion 102 has propagated twice through the second 1/λplate 9*b*.

The second portion 102 reflected back at the first mirror 7 then propagates through the second triangular prism 6B and hits the beam splitter surface 6F again, where the second portion 102 is reflected due to the changed polarization of the second portion 102. The second portion 102 therefore continues to propagate through the second triangular prism 6B and then, like the first portion 101, hits the second metalens array 4.

The second metalens array 4 has essentially the same properties as the first metalens array 4 and comprises a plurality of metalenses 40 arranged in the array. In contrast to the first metalens array 3, however, in this example the second metalens array 4 has the property of leaving light in the polarization state of the second portion 102 unchanged, in particular unchanged in terms of collimation, and of collimating light of the first portion 101. This means that the light of both the first and second portions 101, 102 is collimated behind the second metalens array 4, provided that the object light from the input aperture 2 has been collimated and directed in the direction of the first metalens array 3.

An analyzer 14 is arranged behind the second metalens array 4 and matches the polarization states of the first and second portions 101, 102 so that the light beams of the first and second portions 101, 102 can interfere with each other. The analyzer 14 is set to an angular position of 45°, for example, so that the matched first and second portions 101, 102 have the same polarization directions.

A detector 5 is arranged behind the analyzer 14 and is configured to record the interfering first and second portions 101, 102 of the object light. The detector 5 can be a camera, for example. The interfering first and second portions 101, 102 of the object light form an interference pattern on the detector 5, which can be evaluated by means of an evaluation unit (not shown) in order to generate three-dimensional image information.

With reference to object light 10, which encloses a first inclination angle not equal to 0° with the optical axis OA, the following should now be noted. Due to the special arrangement according to the invention of the optical components of the system 1, the object light beams of the first portion 101 and the second portion 102 of the object light, which enter the system 1 at the first inclination angle β, i.e. enclose the first inclination angle β with the optical axis OA behind the input aperture 2, enclose a second inclination angle β' after reflection at the reflector array 8 or, respectively, the planar mirror 7. This second inclination angle β' is twice as large as the first inclination angle β and is achieved by using the combination of planar mirror 7 and reflector array 8. While the first portion 101 has an angle of incidence β after reflection at the reflector array 8, the second portion 102 has an angle of emergence of −β after reflection at the planar mirror 7. These angles then add up to twice the first inclination angle 2β, which corresponds to the second inclination angle β'.

The advantage of this arrangement is an improved lateral resolution of system 1 compared to other systems. Furthermore, such a system 1 does not comprise any moving precision mechanical components, which makes the system 1 extremely robust and enables a very compact design.

The system 1 according to the invention allows the person skilled in the art to calculate the wavefronts of the object light from the local wavefront angles per metalens of the second metalens array or, respectively, from the interference frequencies of the interference pattern generated on the detector, which in turn allow a z-deviation from the focal plane of the input aperture to be inferred; i.e., in addition to the lateral spatial resolution, to generate image information relating to a z-position of the region of the object under investigation.

As an alternative to the optical properties of the second metalens array 4, it can also be considered to design the second metalens array 4 identically to the first metalens array 3, i.e. in particular identically also with regard to its optical properties with respect to the polarization states.

In this case, a λ/2 plate 11 (indicated by a dashed line) would be arranged behind the beam splitter cube 6 on the side of the second metalens array 4, in front of the second metalens array 4, which λ/2 plate rotates the polarization states of the first and second portions 101, 102 by 90° so that they correspond again to their original predefined polarization states. This embodiment with two completely identical metalens arrays 3, 4 has the advantage that the system 1 and the metalens arrays 3, 4 can be produced comparatively inexpensively.

In a further advantageous embodiment, which is shown in FIG. 1 with respect to at least one embodiment, the system 1 comprises a means for shifting a light wave phase for the first and/or the second portion 101, 102 of the object light. This can prevent an interfering DC or uniform light signal on the detector 5. For this purpose, the phase in the first or in the second portion is typically achieved, for example, by slightly changing the optical path (also referred to as optical path length).

The change in the optical path can be achieved by an actual geometric lengthening of the path for the first and/or the second portion, or by an adaptation or variation of the refractive index through which the first and/or the second portion runs.

In FIG. 1, a phase adaptation is realized by an actuator 12, which can shift the reflector array 8 at least along the optical axis OA of the input aperture 2 (even if this is convoluted by the beam splitter cube).

The actuator 12 can, for example, comprise a piezo element that can be controlled via an electrical control. In particular, the piezo element can be a piezo ring element. The actuator 12 thus enables a change in the optical path for the first portion 101 of the object light, which is reflected, coming from the input aperture 2, via the beam splitter 6 in the direction of the reflector array 8. By shifting the reflector array 8 along the optical axis OA, a relative phase to the second portion 102 of the object light can be set.

Alternatively or additionally, a further actuator 12' can also be arranged on the side of the first mirror 7 and can be configured to move the mirror 7 at least along the optical axis OA of the input aperture 2.

It is also possible that both an actuator 12 controls the reflector array 8 and another actuator 12' controls the first mirror 7, so that the optical paths of both the first 101 and the second portion 102 can be changed.

Alternatively or additionally, it would also be possible to generate a refractive index change in one or both triangular prisms 6A, 6B of the beam splitter cube 6, so that the light wave phases of the first and/or the second portion 101, 102 can be set (not shown). The refractive index can be changed by applying an electrical voltage to the first and/or second triangular prism 6A, 6B. For this purpose, the triangular prisms 6A, 6B must be made of a material familiar to the person skilled in the art.

Alternatively, the phase change in one of the two polarization states can be set by the first and/or the second metalens arrays 3, 4. This can be achieved, for example, by a phase shifter element, or by new developments in the metalens of the array itself, which allow the phase of a polarization direction to be varied by applying an electrical or magnetic variable.

Regardless of how the phase shifts are generated, the system 1 is designed in particular to enable relative phase shifts of more than 2π, so that in addition to uniform-light suppression in the interferograms of individual wavelengths or wavelength ranges, it is also possible to separate different colors or wavelength ranges that are further apart using the phase position. The corresponding separation is possible, for example, by means of a Fourier transform and is generally known to the person skilled in the art.

Figure 2:
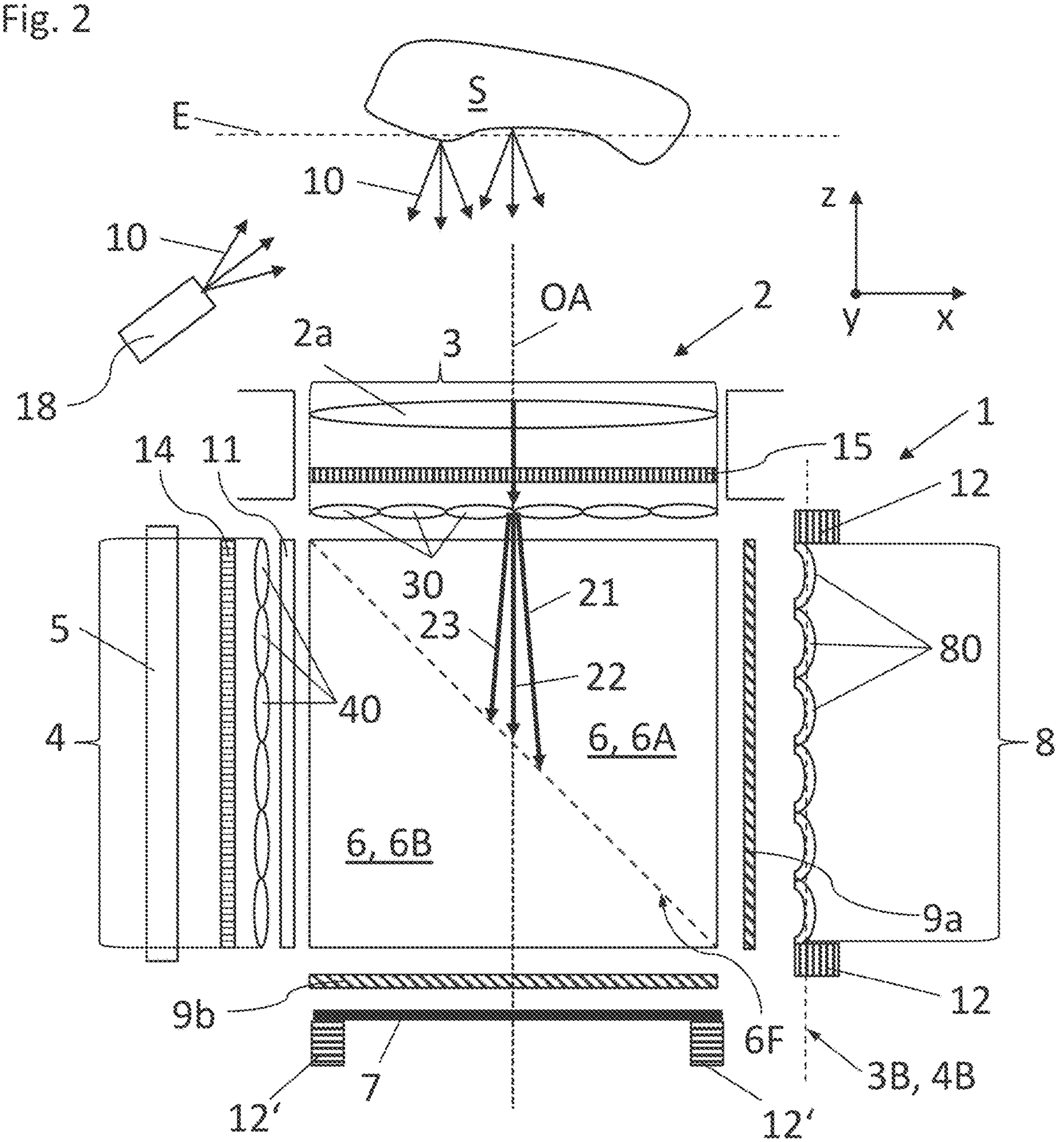
FIG. 2 shows a schematic view of a second embodiment of the invention with color separation.

Based on FIG. 1, FIG. 2 shows an expansion of the invention for all three primary colors RGB of the system 1. Although the shifting of phases over a larger range (several 2π) has already been described in the previous paragraphs, this can limit the dynamic range of the detector 5, since the signals of all primary colors preferably show a high degree of interference in a central region around the optical axis OA of the system (now with reference to the detector) (and less at the edge) and thus an undesirable signal amplification can occur. Therefore, FIG. 2 shows an embodiment that slightly deflects the three primary colors wavelength-selectively from the central region around the optical axis OA in the region of the first metalens array 3. This can be realized using a local prism, an optical grating or a VPH (not shown), which is superimposed on the actual lens effect of the first metalens array 3.

Alternatively or additionally, this property can also be fulfilled by the first metalens array 3 itself. FIG. 2 shows the wavelength-selective deflection via the first metalens array 3 for three different wavelengths (also referred to as three colors RGB in the context of the specification) in the form of beams (arrows 21, 22, 23).

Each of the three wavelengths/colors per object point or, respectively, object region generates an interferogram or, respectively, interference pattern with a spatial frequency and a direction on the detector 5. Together with phase shifts as described for FIG. 1, the respective spectral image portions can be separated by the person skilled in the art so that spatially resolved 3D color image information can be generated by evaluating the interference pattern on the detector 5 using an evaluation unit.

In order to increase the resolution of the system 1, in particular along the optical axis OA, the system 1 can be modified with a beam splitter 6 designed as follows. This system then allows an extremely high resolution along the z-axis, particularly in the sub-micrometer range.

Figure 3:
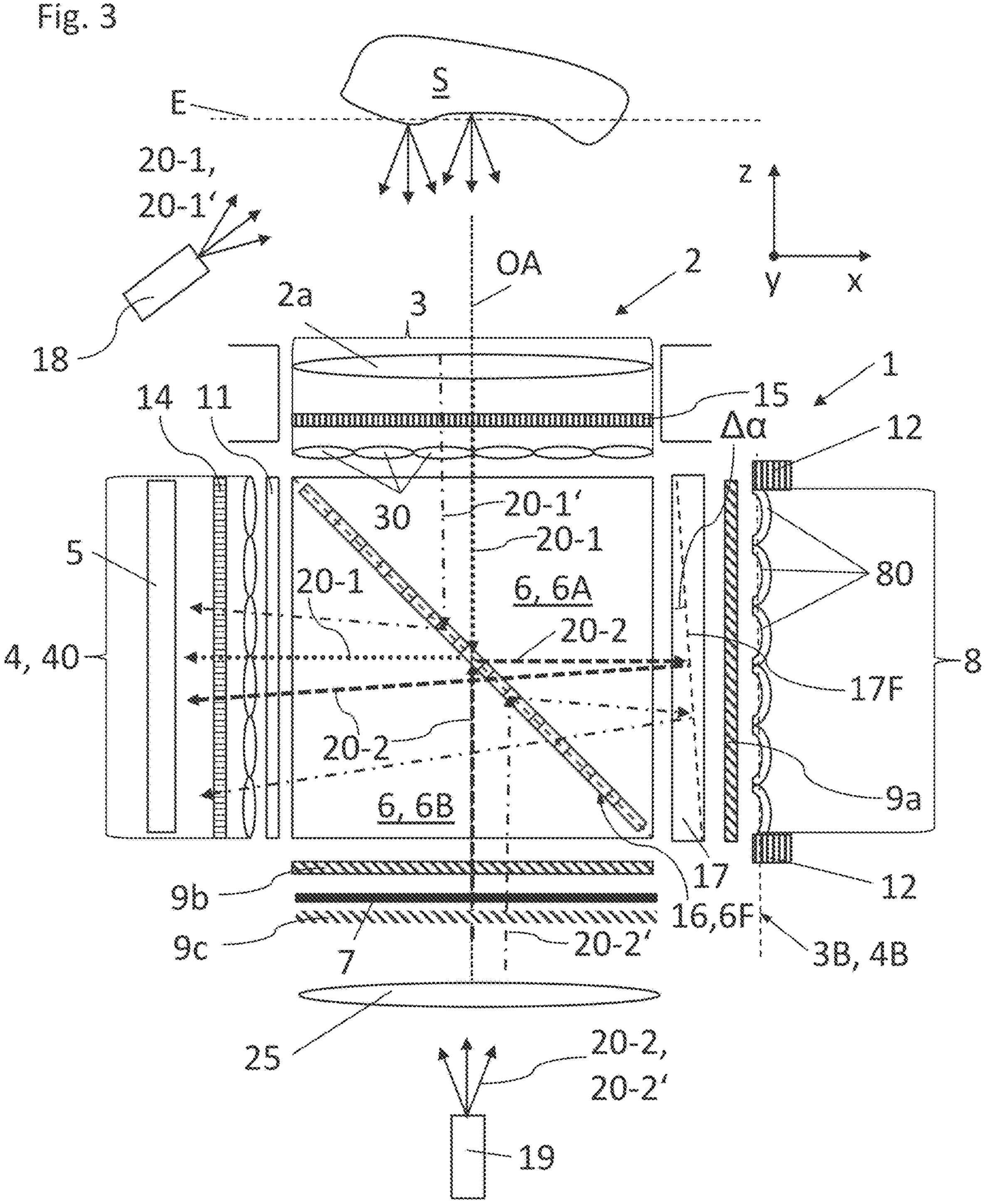
FIG. 3 shows a schematic view of a third embodiment of the invention VPH.

In the exemplary embodiment shown in FIG. 3, the beam splitter cube 6 comprises a transmission diffraction grating arrangement in the form of at least one volume phase hologram grating (VPH) 16 along the beam splitter surface. VPHs 16 are commonly known to the person skilled in the art as volume phase holographic (transmission) gratings. Furthermore, the system comprises a wavelength-selective prism arrangement 17, in particular a wavelength-selective double prism arrangement 17, on the side of the beam splitter cube 6 opposite the detector 5.

It should be noted that, according to this example, the VPH 16 and the prism arrangement 17 are configured for a second spectral range, and in particular are transparent for the first spectral range of the object light, i.e. the wave fronts of the first spectral range pass through the VPH 16 and the prism arrangement 17 unchanged. Conversely, the prism arrangement 17 is configured so that light from the second spectral range is reflected at a prism surface 17F, whereas light from the first spectral range propagates through the prism surface 17F and thus comes through the prism arrangement 17 unchanged.

The VPH 16 is also configured to diffract light from the second spectral range depending on the angle and wavelength, and to allow light from the first spectral range to propagate through it unchanged.

Conversely, the metalens arrays 3, 4, the polarizer 15 and the $\lambda/4$ plates 9*a*, 9*b* and, if applicable, the $\lambda/2$ plate 11 also behave transparently (and in particular optically neutrally) and leave the wave fronts and polarization states of the object light of the second spectral range unchanged. The light from the second spectral range is used by the system 1 to generate a particularly high spatial resolution, in particular along the optical axis.

Instead of the beam path shown in FIG. 1 for the object light in the first spectral range, FIG. 3 shows the beam path for the object light 20-1 and reference light 20-2, which in this example is also in the second spectral range. The reference light 20-2, which is preferably also s-polarized, at least when it hits the VPH, is emitted by a reference light source 19, e.g. a single-mode aperture, and collimated via a collimating optical unit 25. The optical axes of the collimating optical unit 25 and of the input aperture 2 lie on top of each other. The reference light 20-2 then enters the beam splitter cube 6 in this collimated state from a side of the beam splitter cube 6 opposite the input aperture 2. To make this possible, the planar first mirror 7, which reflects object light 10 from the first spectral range, must be transparent for the reference light 20 from the second spectral range. This means that the mirror 7 is at least one dichroic mirror and does not change the wavefronts of the reference light. The second $\lambda/4$ plate 9*a* can also be configured so as not to change the polarization state of the reference light 20-2 or, in interaction with a further retardation element, e.g. a third $\lambda/4$ plate 9*c*, can be configured so that the reference light 20-2 is s-polarized when it strikes the VPH 16.

The mode of operation of the VPH 16 in interaction with the prism arrangement 17 is now described below.

In the example shown, the object light 20-1 from the second spectral range collimated by the input aperture 2 hits the VPH 16 at an angle of approx. 45°. Since the VPH 16 is positioned in what is known as a Littrow arrangement and is optimized for the second spectral range, the incident object light 20-1 from the second spectral range is diffracted by the VPH 16 at an angle of approximately 90° (relative to the incident object light 20-1) or, respectively, approximately 45° (relative to the beam splitter surface 6F) in the direction of the detector 5. Ideally, the object light 20-1 in the second spectral range is linearly polarized when it strikes the VPH 16, in particular s-polarized, since the diffraction efficiency of VPHs is then at its greatest.

On the other side, the collimated reference light 20-2 also hits the VPH 16 and is diffracted by it in the direction of the prism arrangement 17, which is arranged on the side of the beam splitter 6*b* opposite the detector 5. Here too, the VPH 16 is in a 45° position relative to the reference light 20-2 so that a Littrow configuration is also present here.

The reference light 20-2 propagates in the direction of the prism arrangement 17 and is reflected there at a reflective surface 17F of the prism arrangement 17, which encloses an angle $\alpha$ with the beam splitter surface and thus the VPH. The angle $\alpha$ (not shown, instead the differential angle (prism angle) $\Delta\alpha=45°-\alpha$) is not equal to 45° in this case, but either greater or less than 45°, in particular greater or less than 45° by more than 0.2°. As a result, the reference light, which is diffracted at an angle of 45° from the VPH 16 in the direction of the prism arrangement 17, is reflected by the prism arrangement 17 back onto the VPH 16, where the reference light 20-2 hits the VPH 16 at an angle different from 45°. As a result, however, at least part of the back-reflected reference light 20-2 from the VPH 16 is not diffracted back in the direction of the reference light source 19, but propagates through the VPH 16 in the direction of the detector 5, where it interferes, at an angle corresponding to twice the angle $\alpha$, relative to the diffracted object light 20-1 on the detector 5.

The core idea of this embodiment is that the beam splitter cube 6 has a VPH 16 along its beam splitter surface 6F, which VPH encloses an angle $\alpha$ not equal to 45° with the reflective surface 17F of the prism arrangement 17. As a result, reference light 20-2 is transmitted at least partially and to a sufficiently high degree from the VPH 16 in the direction of the detector 5 when it strikes the VPH 16 for the second time (after reflection at the prism arrangement 17).

In particular, it is provided that the light from the second spectral range is present in the form of optical frequency combs comprising a plurality of disjoint, narrow-band spectral lines—in particular with line widths in the sub-nanometer range.

Due to the properties of the VPH 16, the plurality of spectral lines is then diffracted slightly differently in a wavelength-selective manner (cf. beams at 20-1', 20-2') so that a dispersive splitting of the spectral lines takes place on the detector side 5, which enables a highly precise spatial resolution along the optical axis OA. The information about the z-position of the object S can be found in particular in the phase data of the individual spectral lines. Combined with the information from the interference pattern of the first spectral range, such a system 1 makes it possible to determine high-resolution 3D color information of an object S.

The second spectral range is typically in the near-infrared or infrared range. Meaning, for example, in the range from 700 to 900 nm, or even in a range of 1300 nm and more. In the latter case, it is even possible to measure below biological tissue surfaces.

It is of course also possible to provide a separate arrangement for the VPH 16 described in the previous paragraphs, which only has the optical components required for the second spectral range, i.e. in particular the VPH 16 and the prism arrangement, which can then also be designed as a mirror.

In addition, the system 1 can be equipped with a further VPH (not shown), wherein the further VPH is optically active in a different third spectral range and diffracts the incident light there depending on the wavelength and angle. In this way, even the third spectral range can be scanned with the appropriate components and transmission properties of these components.

For example, it would be possible to capture a surface profile in the near-infrared and at the same time a structure below the surface in the infrared range, wherein the system is operated in the visible (first spectral) range using the described metalens array mode of action.

Alternatively, it is also possible for the second spectral range and the first spectral range to be nested, but without overlapping, i.e. the first spectral range comprises, for example, three wavelength ranges which are characteristic of the color channels (or colors) red, green and blue, for example, whereas the second spectral range lies in at least one wavelength range which is located between these three wavelength ranges.

The wavelength range of the first spectral range for the blue color channel extends in particular from 420 nm to 480 nm, the wavelength range of the first spectral range for the green color channel extends in particular from 520 nm to 565 nm, and the wavelength range of the first spectral range for the red color channel extends in particular from 630 nm to 680 nm. The second spectral range can therefore extend, for example, in a wavelength range from 505 nm to 515 nm, and/or from 570 nm to 625 nm, or from 690 nm upwards.

Figure 4:
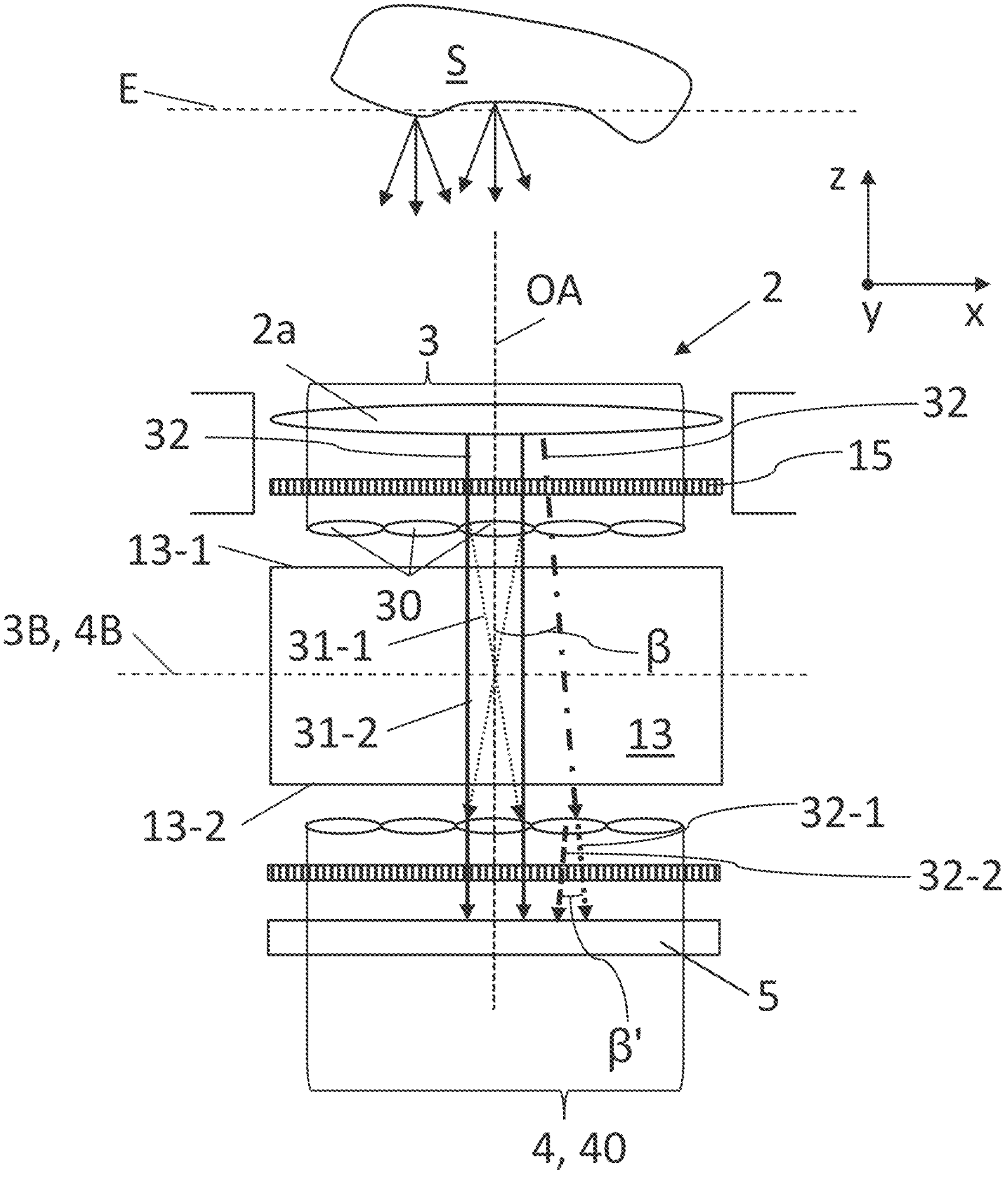
FIG. 4 shows a schematic view of a fourth embodiment of the invention without a beam splitter.

A significantly less complex embodiment of the invention is shown in FIG. 4. In this variant, the beam splitter cube can be omitted without having to abandon the basic idea of the invention. The advantage of the embodiment shown in FIG. 4 is the possibility of an ultra-compact design.

In FIG. 1, the edge length of the beam splitter cube determines the dimension in all three spatial directions. In FIG. 4, however, the spatial direction perpendicular to the optical axis can be selected to be smaller. Instead of the beam splitter cube, a transparent solid element is provided, a first surface of which faces in the direction of the first metalens array and a second surface of which, opposite the first surface, faces in the direction of the second metalens array, in particular wherein a volume comprised by the transparent solid element is free of selectively reflecting and selectively diffracting surfaces, in particular wherein the transparent element is cuboidal or plate-shaped.

The element can therefore be a glass plate or a polymer plate, for example. On the transparent element, the first metalens array is arranged on a planar surface opposite the second metalens array, which is arranged on a planar surface on a side opposite the first surface. The input aperture and the polarization states generated there, which are imposed on the object light, have already been described in connection with FIG. 1.

Metalenses can easily be produced with a numerical aperture NA=0.5. With a typical metalens diameter of 1 mm, the focal length would be 1 mm to a metalens plane, i.e. the transparent element separating the metalens arrays would have to be about 2 mm (for the sake of simplicity, the refractive index of the transparent element was not taken into account). This would again be significantly smaller than, for example, the height of an edge of a beam splitter cube (e.g. 5 mm). Furthermore, design height, height and lateral dimensions are decoupled in this example, which is advantageous in particular for cell phone applications, where structure height is an absolute premium, while design sizes along the lateral direction are not a problem.

This means that, with a compact design along the z-axis (design height), a large-area detector can still be used, since it extends along the x- and y-directions.

For the beam path in detail, reference is made in particular to FIG. 1 with regard to the polarization states and their generation at the input aperture.

FIG. 4 shows two different light beams of the object light. The first situation relates to a first object light beam 31, which originates from a region of the object under investigation that lies on the optical axis OA of the input aperture 2. The second situation relates to a second object light beam 32, which originates from a region of the object under investigation that is laterally offset from the optical axis OA of the input aperture 2.

The first object light beam 31 is collimated by the input aperture 2 and then propagates further parallel to the optical axis OA of the input aperture 2, i.e. it encloses an angle of 0° with the optical axis OA of the input aperture 2. The angle enclosed by the collimated object light with the optical axis is also referred to as the first inclination angle β in the context of this specification.

The first inclination angle β is defined in particular by the angle enclosed between the optical axis OA of the input aperture 2 and the propagation direction of the collimated object light beam.

The second object light beam 32 is also collimated by the input aperture 2 and then propagates further, but with a first inclination angle β to the optical axis OA of the collimating lens 2*a* that is not equal to 0°. According to the laws of ray optics, the first inclination angle β contains (together with an assigned focal length of the input aperture) information about the lateral position on the object under investigation from which the relevant object light beam originates.

The input aperture 2 also comprises a polarizer 15, which is configured to bring the object light into a predefined polarization state. In particular, the polarizer 15 is configured in such a way that it brings the object light into the predefined polarization state—at least for object light from the first spectral range.

In the present case, the polarizer 15 is arranged and set (e.g. at an angle of rotation of 45°) in such a way that the object light, regardless of a direction of incidence or the first inclination angle β, has s- and p-polarized light in approximately equal proportions. This means that the predefined polarization state in this example is composed of a first polarization state, which comprises s-polarized object light, and a second polarization state, which comprises p-polarized object light. The assignment of the s-polarized object light to the first polarization state of the p-polarized object light to the second polarization state can also be done the other way round and is only for illustrative purposes.

In the following, the case of s- and p-polarized polarization states will be discussed without restriction of generality.

The object light with the predefined polarization state just described now hits the first metalens array 3 according to the invention. According to the invention, the first metalens array 3 is now arranged and configured such that it focuses a first portion 31-1 of the object light, which has the first polarization state, whereas a second portion 31-2 of the object light, which has the second polarization state, propagates essentially unchanged through the first metalens array 3.

In particular, the focused first portion 31-1 is focused in such a way that it is focused on a focal plane 3B associated with the first metalens array 3.

This applies to both the first and the second object light beam 31, 32.

The second metalens array 4 is arranged here so that a focal plane 4B associated with the second metalens array 4 lies on the focal plane 3B associated with the first metalens array 3. Furthermore, the second metalens array 4 is configured such that it collimates object light 31-1, which has the first polarization state and is thus focused on the focal plane 3B of the first metalens array 3, and transmits the second portion 31-2 of the object light, which has the second polarization state, essentially unchanged—the second portion 31-2 is thus still collimated afterwards.

For the first object light beam 31, which encloses an angle of 0° with optical axis OA, this means that it comes out of the second metalens array 4 at an angle of 0° and hits the detector 5 at this angle.

For the second object light beam 32, which propagates at a first inclination angle β not equal to 0° to the optical axis OA, it follows that the first portion 32-1 of the second object light beam 32, after appropriate focusing and recollimation of the first portion 32-1 with the first polarization state, encloses a second inclination angle β', which is twice as large as the first inclination angle β, with the second portion 32-2 of the second object light beam, which propagates essentially unchanged through the first and second metalens arrays 3, 4. The first and second portions 32-1, 32-2 of the second object light beam 32 thus hit the detector, which is arranged behind the second metalens array 4, at this second inclination angle. In particular, an analyzer 14 can also be arranged in front of the detector 5, which analyzer matches the polarization states of the first and second portions, in particular in a 45° rotation, so that an improved interference and thus an improved interference pattern is produced on the detector 5.

In order to achieve a relative phase adaptation of the wave fronts with respect to the first portion and the second portion, as described in connection with FIG. 1, the solid transparent element can comprise a liquid crystal (not shown), which has a different refractive index for object light of the first and/or the second polarization state, so that a phase relationship with respect to the wave fronts that can be controlled via the liquid crystal can be set. A control unit can be provided in the system for this purpose.

The embodiment described in FIG. 4 is particularly advantageous for metalens arrays 3, 4 with metalenses having a comparatively high numerical aperture; for example, a numerical aperture greater than 0.4.

Irrespective of the specific embodiment, the system 1 can have a laser light source 18 which is configured to illuminate the object under investigation in a controllable manner and, in particular, to illuminate the object S in certain regions so that a complete image of the object under investigation can be generated, for example, using an optical scanning process.

For this purpose, it can be provided that the laser light source 18 emits different wavelengths in a sequence and thus sequentially illuminates the object under investigation with different wavelengths, so that color information can be obtained from the sequential illumination.

Alternatively, the laser light source can be configured to emit light from the first and second spectral range simultaneously or with a time delay.

REFERENCES

[1] Jangwoon Sung et al, "Progresses in the practical metasurface for holography and lens," Nanophotonics 2019, 8(10), p. 1701-1718.

[2] Ling Li, et al., "Polarization-Switchable Multi-Focal Noninterleaved Metalenses in the visible," Laser& Photonics reviews, 2021, 15, 2100198,

LIST OF REFERENCE SIGNS

1 System
2 Input aperture
2*a* Collimating optical unit/lens/objective
3 First metalens array
30 Metalenses
3B Focal plane of the first metalens array
4 Second metalens array
40 Metalenses
4B Focal plane of the second metalens array
5 Detector
6 Beam splitter
6A First prism of the beam splitter
6B Second prism of the beam splitter
6F Reflective surface
7 First mirror
8 Reflector array
80 Retroreflectors
9*a* First λ/4 element
9*b* Second λ/4 element
11 λ/2 element
12, 12' Actuator arrangement
13 Solid transparent element
13-1 First side of the solid transparent element
13-2 Second side of the solid transparent element
14 Analyzer
15 Polarizer
16 VPH
17 Prism arrangement, double prism
17F Reflective surface
18 Object light source
19 Reference light source
25 Reference light collimating optical units
21, 22, 23 Red (21), green (22), blue (23) light beams
31 First light beam
31-1 First portion
31-2 Second portion
32 Second light beam
32-1 First portion
32-2 Second portion
10 Object light
101 First portion
102 Second portion
10*a* First light beam
10*b* Second light beam

20-1, 20-1' Object light beam in the second spectral range
20-2, 20-2' Reference light beam in the second spectral range
E Focal plane of the input aperture
OA Optical axis
S Object under investigation
x, y, z Directions of a Cartesian coordinate system
Δα Prism angle
β First inclination angle
β' Second inclination angle

The invention claimed is:

1. An optical system (1) for 3D imaging having at least the following components:

An input aperture (2) having an optical axis (OA),

A first metalens array (3) and a second metalens array (4),

A detector (5), wherein the input aperture (2) is configured to collimate object light (10) coming from an object under investigation (S) in a first spectral range and to fix it in a predefined polarization state which is composed of two polarization states conjugate to one another, wherein the object light (10) propagates to the first metalens array (3) at a first inclination angle (B) with respect to the optical axis (OA) of the input aperture (2), wherein the first metalens array (3) is configured and arranged to focus a first portion (101) of the object light (10), which comprises a first polarization state of the two polarization states conjugate to each other, and to leave a second portion (102) of the object light (10), which comprises a second polarization state of the two polarization states conjugate to each other, unchanged, wherein the second metalens array (4) is configured and arranged to collimate the focused first portion (101) and to transmit the second portion (102) unchanged, so that the first portion (101) and the second portion (102) each have the same wavefront curvature after they have propagated through the first and second metalens arrays (3, 4), and enclose a second inclination angle (β') with each other in relation to their respective propagation directions and hit the detector (5) forming an interference pattern, wherein the second inclination angle (β') corresponds to twice the first inclination angle (β) in terms of magnitude and three-dimensional position information of an object region of the object under investigation (S) can be generated based on the interference pattern.

2. The system (1) according to claim 1, characterized in that the first and the second portion (101, 102) of the object light (10) are each linearly polarized perpendicular to each other.

3. The system (1) according to claim 1, wherein the system (1) comprises a polarization-dependent beam splitter (6) between the first and the second metalens array (3), wherein the system (1) also has the following components:

A first mirror (7),

A reflector array (8) comprising a plurality of reflective retroreflectors (80), A first λ/4 element (9*a*) arranged between the polarization-dependent beam splitter (6) and the first mirror (7), A second λ/4 element (9*b*) arranged between the polarization-dependent beam splitter (6) and the reflector array (8), wherein the polarization-dependent beam splitter is arranged in relation to object light (10) incident from the first metalens array (3) in such a way that the first portion (101) is reflected by the beam splitter (6) and the second portion (102) is transmitted through the beam splitter (6), wherein the reflector array (8) is arranged on a side of the beam splitter (6) to which the first portion (101) coming from the first metalens array (3) and reflected by the beam splitter (6) propagates, wherein the first mirror is arranged on a side of the beam splitter (6) which is opposite the first metalens array (3), wherein the first mirror (7) reflects the second portion (102) hitting the first mirror (7) back in the direction of the beam splitter (6) and to the second metalens array (4).

4. The system (1) according to claim 3, characterized in that a λ/2 element (11) is arranged between the beam splitter (6) and the second metalens array (4) and is configured to reverse the polarization states of the first and the second portion (101, 102).

5. The system (1) according to claim 3, characterized in that the system (1) comprises an actuator arrangement (12) which is configured to set a position of the first mirror (7) and/or of the reflector array (8) so that a phase can be set between the wavefronts associated with the first and the second portion (101, 102).

6. The system (1) according to claim 1, characterized in that the system (1) comprises a transparent solid element (13), a first surface (13-1) of which faces in the direction of the first metalens array (3) and a second surface (13-2) of which, opposite the first surface (13-1), faces in the direction of the second metalens array (4).

7. The system (1) according to claim 1, characterized in that the system (1) comprises at least one liquid crystal, which is configured to adapt a phase between the wavefronts associated with the first and second portions (101, 102).

8. The system according to claim 6, wherein the transparent solid element (13) comprises the at least one liquid crystal or consists of the at least one liquid crystal.

9. The system according to claim 7, characterized in that the polarization-dependent beam splitter (6) comprises a first and a second prism (6A, 6B) forming a beam splitter cube of the beam splitter (6), wherein the first and/or the second prism (6A, 6B) comprises the at least one liquid crystal.

10. The system (1) according to claim 1, characterized in that a focal plane (3B) of the first metalens array (3) and a focal plane (4B) of the second metalens array (4) lie on top of each other.

11. The system (1) according to claim 1, characterized in that an analyzer (14) is arranged behind the second metalens array (4) and in front of the detector (5) in the propagation direction, which analyzer is configured to match the polarization states of the first and the second portion (101, 102) so that interference of the first portion (101) with the second portion (102) is achieved on the detector (5).

12. The system (1) according to claim 1, characterized in that the input aperture (2) comprises a polarizer (15), which is configured to bring the object light (10) from the first spectral range into the predefined polarization state.

13. The system (1) according to claim 1, characterized in that the input aperture (2) comprises at least one lens (2*a*), which is configured to collimate the object light (10) coming from the object under investigation (S).

14. The system (1) according to claim 1, wherein the system (1) is configured to deflect the propagation direction of the object light (10) from the first spectral range hitting the system (1) in a wavelength-dependent manner, so that the object light (10) and the first and second portions (101, 102) enclose a wavelength-dependent angle with the optical axis (OA) in addition to the first inclination angle (B).

15. The system (1) according to claim 1, characterized in that the object light (10) in the first spectral range consists of two or more disjoint wavelength ranges and/or wherein the system (1) is configured to filter the object light (10) into two or more disjoint wavelength ranges forming the first spectral range, wherein there are gaps between the wavelength ranges, wherein for each wavelength range an interference pattern is generated on the detector (5), from which three-dimensional position information and a color composition with respect to the wavelength ranges of an object region of the object under investigation (S) can be created.

16. The system (1) according to claim 3, characterized in that the object light (10) comprises at least one further spectral range which is different from and disjoint from the first spectral range, wherein the first and the second metalens array (3, 4) And the polarization-dependent beam splitter (6) are transparent and optically inactive for light from the at least one further spectral range, wherein the polarization-dependent beam splitter (6) further comprises a volume phase hologram, VPH (16), which is configured to diffract the light from the at least one further spectral range in a polarization- and angle-dependent manner and to be transparent and optically inactive for the light from the first spectral range.

17. The system according to claim 16, characterized in that the system is configured to direct reference light from the second spectral range to the VPH via a side of the beam splitter (6) opposite the input aperture, wherein the first mirror is transparent in particular for reference light.

18. The system according to claim 17, characterized in that the system (1) comprises a third λ/4 element (9*c*), which is arranged on a side of the first mirror (7) facing away from the beam splitter (6), and which is configured to bring the reference light (20-2, 20-2') into a predefined polarization state in cooperation with the second λ/4 element (9*b*), so that the reference light (20-2, 20-2') is s-polarized when it comes from the first mirror and hits the VPH (16).

19. The system (1) according to claim 16, wherein the system (1) has a wavelength-selective prism arrangement (17) between the reflector array (8) and the beam splitter (6), which prism arrangement is configured to reflect light of the at least one further spectral range at a prism angle ($\Delta\alpha$) in the direction of the detector (5), and wherein the prism arrangement (17) is transparent and optically inactive for light from the first spectral range.

20. The system (1) according to claim 1, characterized in that the first portion (101) and the second portion (102) are each collimated after they are propagated through the first and the second metalens array (3, 4).

21. The system (1) according to claim 2, characterized in that the predefined polarization state is a linearly polarized polarization state consisting of a superposition of the first and the second portion (101, 102).

22. The system (1) according to claim 3, characterized in that the back-reflected first and the back-reflected second portion (101, 102) propagate through the polarization-dependent beam splitter (6) in the direction of the second metalens array due to the reversed polarization states.

23. The system (1) according to claim 16, characterized in that the volume phase hologram (16) extends along a reflective surface (6F) of the beam splitter (6).

* * * * *